(12) United States Patent
Neubrand et al.

(10) Patent No.: US 6,237,986 B1
(45) Date of Patent: May 29, 2001

(54) FOLDING HOOD FOR A MOTOR VEHICLE

(75) Inventors: Frank Neubrand, Stuttgart; Thomas Halbweiss, Marbach; Wojciech Wezyk, Sindelfingen; Berthold Klein, Rutesheim, all of (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 09/440,118

(22) Filed: Nov. 15, 1999

(30) Foreign Application Priority Data

Nov. 14, 1998 (DE) .............................................. 298 23 383
Mar. 16, 1999 (DE) .............................................. 199 11 541

(51) Int. Cl.⁷ ...................................................... B60J 7/00
(52) U.S. Cl. ........................... 296/107.01; 296/107.08; 296/116; 296/117; 296/118; 296/109
(58) Field of Search ........................... 296/107.09, 117, 296/116, 118, 109, 107.01

(56) References Cited

U.S. PATENT DOCUMENTS

| | | | | |
|---|---|---|---|---|
| 1,631,818 | * | 6/1927 | Hutt ............................... | 296/107.09 |
| 2,172,303 | * | 9/1939 | Uebergang ..................... | 296/118 |
| 2,794,672 | * | 6/1957 | Burzi .............................. | 296/107.09 |
| 2,860,913 | | 11/1958 | Kuiper et al. . | |
| 3,097,883 | * | 7/1963 | Gilson et al. .................. | 296/117 |
| 3,116,087 | * | 12/1963 | Baumann ........................ | 296/117 |
| 4,621,861 | * | 11/1986 | Scaduto ......................... | 296/107.09 |
| 4,720,133 | * | 1/1988 | Alexander et al. ............. | 296/117 |
| 4,840,421 | * | 6/1989 | Hennessy ....................... | 296/107.09 |
| 4,991,902 | * | 2/1991 | Schrader et al. ............... | 296/107.09 |
| 5,385,381 | * | 1/1995 | Moore et al. .................. | 296/117 |
| 5,511,844 | * | 4/1996 | Boardman ...................... | 296/107.09 |
| 5,667,269 | * | 9/1997 | Prenger et al. ................. | 296/107.09 |
| 6,048,021 | * | 4/2000 | Sautter ........................... | 296/107.09 |

FOREIGN PATENT DOCUMENTS 196 46 035
A1   11/1996  (DE) .

* cited by examiner

Primary Examiner—Joseph D. Pape
Assistant Examiner—Kiran B. Patel
(74) Attorney, Agent, or Firm—Evenson, McKeown, Edwards & Lenahan, P.L.L.C.

(57) ABSTRACT

A folding top for a motor vehicle, which can be adjusted between a closed position and a deposited position, has a folding top linkage and a folding top covering held on the folding top linkage. The folding top linkage comprises a plurality of adjustable side bows and at least one roof bow extending transversely to the longitudinal direction of the vehicle.

In order to improve the design possibilities for the depositing space of a folding top, it is provided that the length of the roof bow is variably adjustable as a function of the position of the folding top.

19 Claims, 8 Drawing Sheets

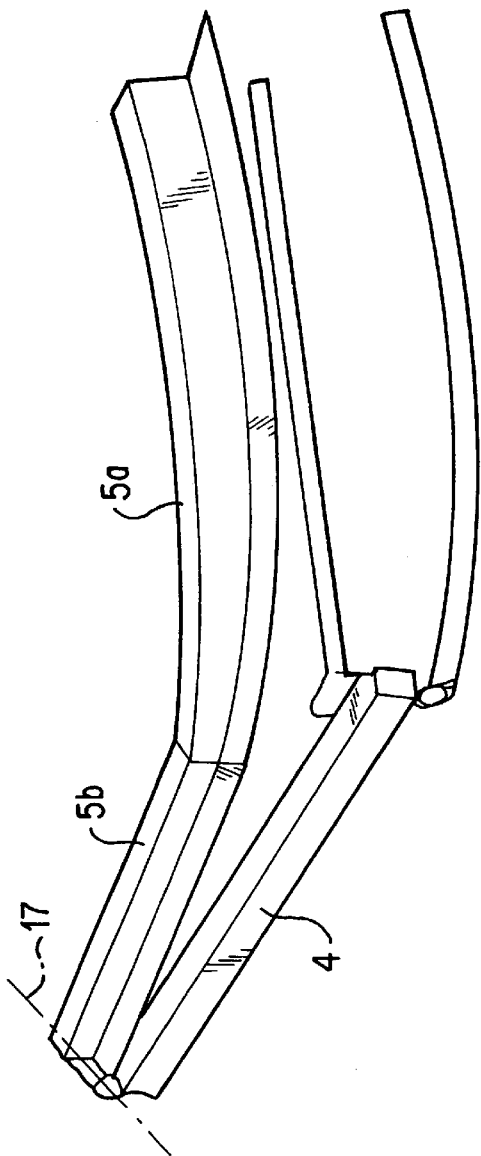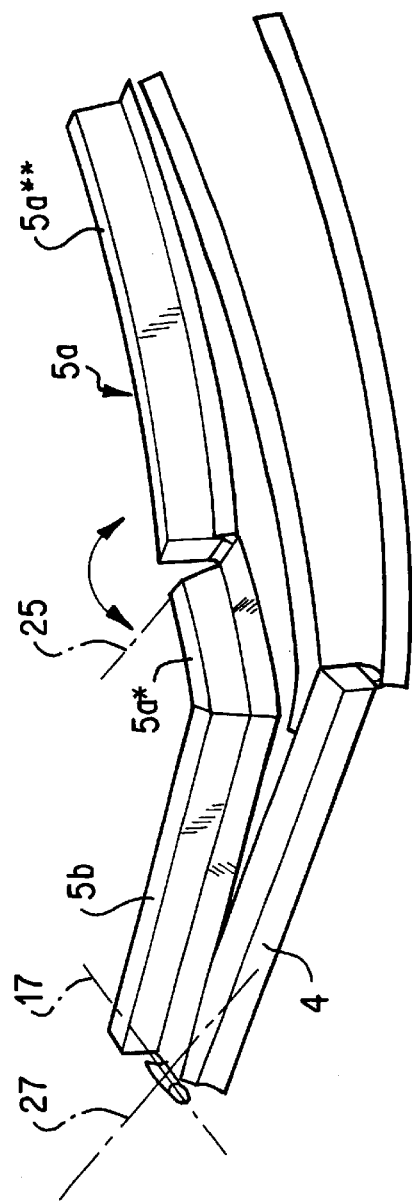

FOLDING HOOD FOR A MOTOR VEHICLE

BACKGROUND AND SUMMARY OF THE INVENTION

The invention relates to a folding top for a motor vehicle which can be adjusted between a closed position and a deposited position.

From German Patent Document DE-PS 943 747, a motor vehicle folding top is known which can be adjusted between a closed position closing the vehicle interior and a deposited position opening up the vehicle interior. The motor vehicle folding top comprises a folding top covering which is mounted on a folding top linkage consisting of a plurality of roof bows and side bows. A forward roof bow extending transversely to the longitudinal direction of the vehicle forms a roof frame which, in the closed position of the folding top, is held on a side frame of the windshield. For opening the folding top, the linkage parts of the folding top are collapsed in a spatial rotating movement and are stowed in a depositing space arranged behind the vehicle compartment, the width of the depositing space being determined particularly by the length of the roof bows, so that the design possibilities for the depositing space are limited to defined minimum measurements. Another disadvantage is the fact that the roof frame partially reaches around the windshield, which extends in a curved manner in the upper area and has a rounded construction in the lateral area and therefore, corresponding to the contour of the windshield has a structure which, as a rule, is spatial, so that, in the depositing position, the roof frame requires a considerable stowage space not only viewed along the vehicle width but also in the other dimensions.

Another problem may arise because of the fact that the covering material fastened to the roof frame, for reasons of tightness, must be connected with the roof frame along its entire length and, because of the spatial curvature of the roof frame, a non-uniformly distributed material tension is generated in the material which, when the material is folded together, can result in an undesirable formation of folds, which may impair a compact depositing of the folding top. Furthermore, tension peaks may damage the material.

The invention is based on the problem of improving the design possibilities for the depositing space of a folding top. In particular, a reliable operability of the folding top and a long operating time are to be ensured.

According to the invention, this problem is solved by providing a folding top including a folding top linkage including a plurality of adjustable side bows and at least one roof bow having a transverse length as viewed in a longitudinal direction of the vehicle. The folding top is arranged such that the length of the at least one roof bow varies as a function of a movement position of the folding top to and from the closed position and the deposited position.

Since, viewed along the width of the vehicle, the length of at least one roof bow is to be variably adjustable, the different constructive demands made on the folding top in the closed position and the deposited position can be taken into account. In the event that the most forward roof bow called the roof frame has a variable length, in the closed position, the roof bow can reach around the entire top side and also around the upper sections of the lateral areas of the windshield and a continuous sealing can be implemented between the windshield and the roof bow. In the closed position, the variable roof bow takes up its intended length, but, in the deposited position, the length of the roof bow can be changed, whereby the required dimensions of the stowage space are considerably reduced. The non-rigid construction relative to the length of the roof bow permits an optimal adaptation to a defined limited available space for depositing the folding top.

It is another advantage that, as the result of the shortening of the roof bow length, material tensions can be reduced during the change from the closed to the deposited position and, in addition, a targeted fold formation can be imposed on the tension-free material sections without the risk of damage.

In an advantageous further development, the roof bow has a multi-part construction and at least two sections which, for shortening the spacing of the roof bow, can be moved relative to one another during the change from the closed position to the deposited position. The shortening of the spacing can be achieved by the rotation and/or displacement of at least one section of the roof bow.

According to an expedient embodiment, the roof bow consists of three sections which are preferably coupled to one another in an articulated manner. In the closed position, all sections are unfolded and form a continuous bow with a common longitudinal axis. In contrast, in the deposited position, the outer sections are at least partially folded in, whereby the length of the roof bow is reduced. The hinges between the sections of the roof bow or between the outer roof bow sections and laterally arranged side bows may each have one axis of rotation as well as two axes of rotation. The axis of rotation of a joint can basically take up any spatial position but, in the deposited position, extends in parallel to the longitudinal direction of the vehicle, to the vertical axis or to the transverse axis of the vehicle. The hinges of a roof bow, relative to one another, can have parallel as well as non-parallel axes of rotation.

According to another expedient embodiment, the three sections of the roof bow are disposed to be displaceable with respect to one another, the displacement direction advantageously coinciding with the longitudinal direction of the roof bow. In the closed position, the sections are in their extended position, but, in the deposited position, they are in the pushed-together position in which, because of the parallelism of the displacement direction and the longitudinal axis of the roof bow, the roof bow length is at a minimum.

In particular, the length of the roof bow is restrictedly kinematically guided as a function of the actual position of the folding top, so that the roof bow can be adjusted without any additional drive only as a function of the adjusting movement of the folding top. In intermediate positions between the closed position and the deposited position, the roof bow takes up intermediate lengths between the maximum to be reached in the closed position and the minimum to be reached in the deposited position.

Additional advantages and expedient embodiments are contained in the additional claims, the description of the figures and the drawings.

BRIEF DESCRIPTION OF THE DRAWINGS

FIGS. 9a, b are views of another embodiment of a roof frame in two different positions;

DETAILED DESCRIPTION OF THE PREFERRED EMBODIMENTS

Figure 1:
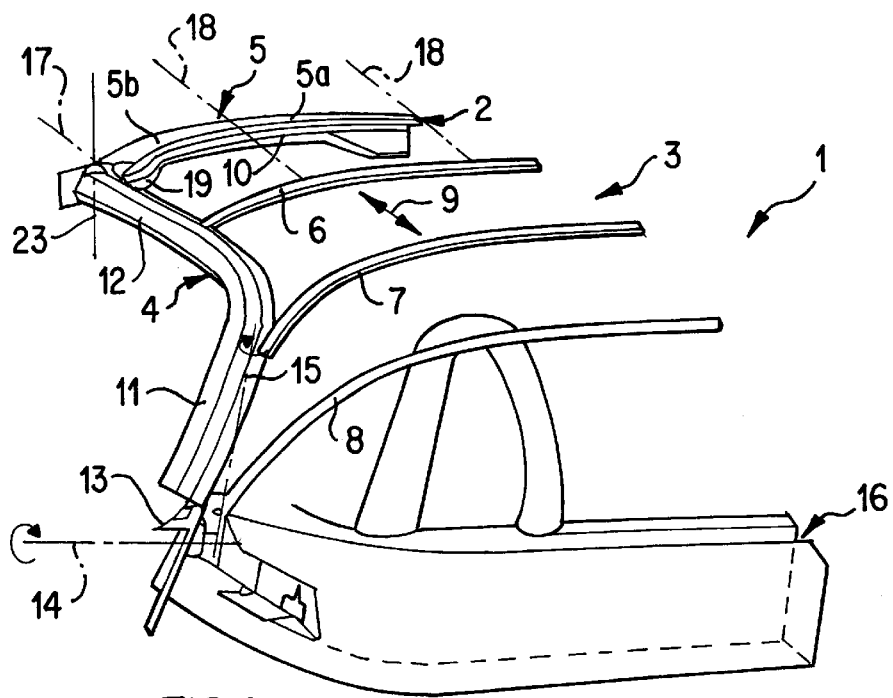
FIG. 1 is a perspective view of a folding top according to the invention in the closed position.

The folding top 1 illustrated in FIG. 1 can be adjusted between the illustrated closed position 2 and a deposited position, in which the folding top 1 is stowed in a depositing space 16. The folding top 1 consists of a folding top linkage 3 with a plurality of kinematically connected linkage parts 4 to 8 as well as a folding top covering which is not shown in the figure and which is fastened to the folding top linkage 3. The folding top linkage 3 comprises a side bow 4 arranged in the window area, a forward transversely situated roof frame 5 and diverse supporting hoops 6, 7 and 8 which extend transversely to the longitudinal direction 9 of the vehicle or to the adjusting direction 9 between the side bow 4 and an opposite side bow on the other vehicle side which is not shown in FIG. 1. In the closed position 2, the folding top 1 is connected with a windshield frame 10 of the vehicle windshield. Expediently, the folding top 1 has only one degree of freedom for the opening and closing of the folding top. All other moving possibilities of the folding top are restrictedly kinematically guided and depend on this degree of freedom.

However, it may also be expedient to provide at least two degrees of freedom for the folding top, in that particularly a lateral swivelling-in of the side bows and the translational forward and backward folding are permitted in the longitudinal direction of the vehicle as independent moving possibilities which preferably are to be operated by way of one drive respectively.

The side bow 4, which is constructed in on e piece, consists of two mutually connected legs, one leg 11 extending approximately vertically in the closed position 2, and a horizontal leg 12. The two legs 11, 12 of the side bow 4 enclose an angle of approximately 90°. The dimensions of the side bow 4 are selected such that a side window of the motor vehicle is covered over its rearward, vertically extending window edge as well as over its upper, horizontally extending window edge completely by the legs 11, 12 of side bow 4. In the closed position, the free front side of the horizontal leg 12 extends to the frame 10 of the windshield, so that, in the closed position, when the side windows are closed, all exposed edges of the side window are covered only by a linkage part, which is the side bow 4.

The side bow 4 is held on a hinge 13 arranged at the vehicle body, which hinge 13 permits two moving possibilities: a rotating movement about a horizontal axis of rotation 14 and a rotating movement about an axis of rotation 15 extending at an angle to the horizontal axis of rotation 14. The two axes of rotation 14, 15 may intersect or cross one another; the axes of rotation enclose particularly a slightly smaller angle than 90°, in the closed position 2, the axis of rotation 15 being slightly inclined with respect to a vertical line toward the interior side of the vehicle. The rotating movements about the two axes of rotation are expediently coupled so that, during an adjusting movement of the folding top in the longitudinal direction 9 of the vehicle which is triggered manually or by a motor, the side bow 4 carries out a spatial kinematically restrictedly guided rotating movement with a simultaneous rotation about the two axes of rotation 14, 15. This spatial rotating movement makes it possible for the side bow 4 to carry out a movement from the closed position 2 in the plane of the side window toward the deposited position in which the side bow 4 is stored in a horizontal plane in the depositing space 16 and the front side of the horizontal leg 12 of the side bow 4 is situated transversely to the longitudinal direction 9 of the vehicle and points in the direction of the opposite vehicle side or folding top side.

Along the entire length of the side bow 4—at the vertical leg 11 and at the horizontal leg 12 as well as in the transition between the two legs—the covering of the folding is fastened at the side bow so that a tension, which acts upon the folding top covering, can be built up and maintained continuously along the length of the side bow. This reduces the danger that, as the result of a non-uniform distribution of tension, the covering material will form folds which may cause leaks and, in addition, may lead to tension peaks which can damage the material. Another advantage of the continuous fastening of the folding top covering on the side bow is the reduction of the driving noise.

In addition, a sealing device in the form of a sealing lip is fastened on the side bow 4 on the side facing the side window. The sealing device can be constructed in one piece a long the length of the side bow, whereby tightness problems can be avoided in the transition between the legs 11 and 12 of the side bow 4. In addition, the manufacturing costs and the mounting costs are lowered for the sealing device as well as for the side bow itself.

The front side of the horizontal leg 12 is hinged to the forward, transversely extending roof frame 5, in which case a first hinge axis 17 extends between the horizontal leg 12 and the roof frame 5 in the closed position 2 in parallel to the longitudinal axis 9 of the vehicle, and a second hinge axis 23 extends in parallel to the vertical axis of the vehicle.

The roof frame 5, which in the embodiment is held in the closed position 2 by way of the side bows 4 by means of a lock 19 on the windshield frame 10, consists of three sections—a center section 5a as well as two outer lateral sections 5b, of which FIG. 1 illustrates only one. By way of one hinge respectively, the lateral sections 5b are connected with the center section 5a in a foldable manner, the hinge axes 18 extending approximately in parallel to the longitudinal axis 9 of the vehicle in the closed position 2 of the folding top. A sealing device, which, in the closed position 2, is acted upon by the roof frame 5 along the length of the windshield frame, is fastened to the windshield frame 10. The folding top covering is fastened to the roof frame 5; specifically, also along the entire length of the roof frame 5 measured in the transverse direction.

As an alternative or in addition to lateral locks, a central lock can also be provided in the center of the roof frame. Instead of being fastening on the windshield frame, the seal can also be arranged on the roof frame.

It may also be expedient to construct the forward roof frame 5 in one piece or to completely eliminate the roof frame. In the latter case, the tension in the covering material in the forward section of the folding top in the closed position is applied by the side bows and by the outward-directed transverse force generated by the side bows to the covering material. Between the side bows, a tension rope can be fastened which, in the closed position, is guided by way of the windshield frame and on which the folding top covering is held.

Supporting hoops 6, 7 and 8 are held on the side bows 4, which supporting hoops 6, 7 and 8 extend transversely to the longitudinal direction 9 of the vehicle over the vehicle interior and extend in parallel to the forward roof frame 5. The supporting hoops 6 to 8 generate additional tension in the covering material and provide stability to the folding top. Analogous to the roof frame 5, the supporting hoops 6, 7 are connected with the side bows in an articulated manner. The supporting hoops may be constructed in one piece or in several pieces, particularly in three pieces, with hinge axes in parallel to the longitudinal direction 9 of the vehicle and hinge axes in parallel to the vertical axis of the vehicle. In the embodiment, the supporting hoop 6 adjacent to the roof frame is constructed of three pieces. In contrast, the supporting hoops 7 and 8 situated farther away from the roof frame are constructed in one piece. The rearmost supporting hoop 8 is optionally not held on the side bows but directly on the bearing of the folding top.

Figure 2:
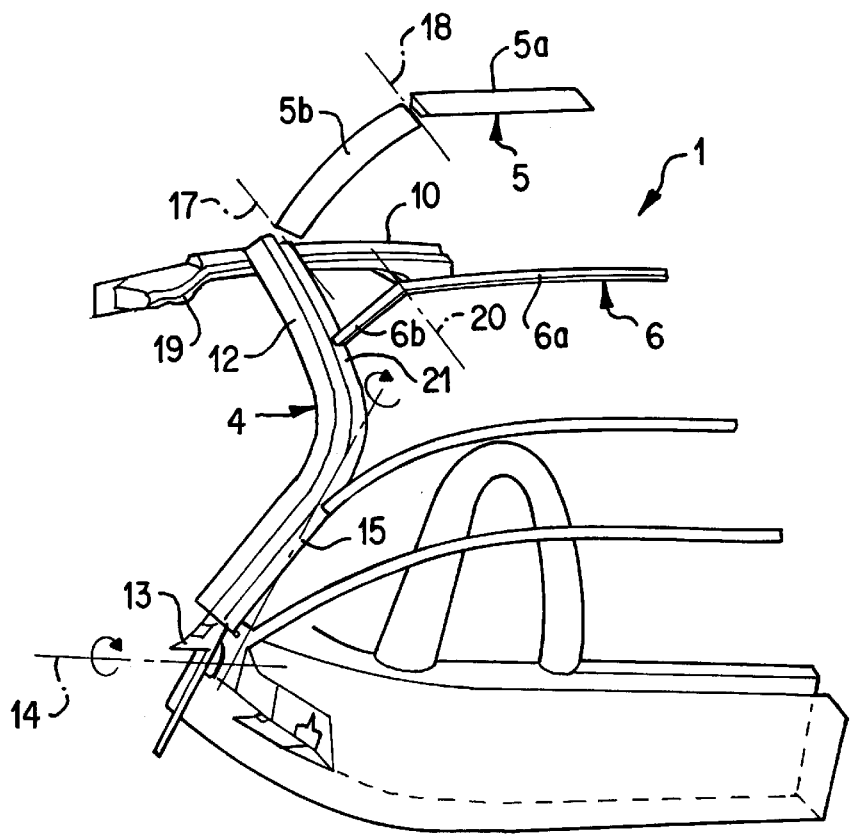
FIGS. 2 to 5 are views of various intermediate positions of the folding top between the closed position and the deposited position.

FIG. 2 shows an intermediate position of the folding top 1 after the release of the lock 19, shortly after the start of the transition from the closed position to the deposited position. The folding top 1 is already slightly tilted in the longitudinal direction of the vehicle toward the deposited position. The forward roof frame 5 is lifted off the windshield frame 10, and the side bow 4 is partially swivelled about the axes of rotation 14 and 15 of the hinge 13. In this tilted position of the folding top 1, the front side of the leg 12 of the side bow 4, with respect to the closed position, is swivelled toward the rear as well as transversely in the direction of the vehicle interior and also first upward. The displacement in the transverse direction results in a shortening of the distance between the front sides of opposite side bows, in which case this shortening necessarily results in a folding-together of the sections 5a and 5b of the roof frame 5 about the axis of rotation 18 and, in addition, results in a simultaneous rotation of the lateral section 5b of the roof frame 5 relative to the leg 12 about the axis of rotation 17.

At the same time, the supporting hoop 6, which is also divided into three parts, is folded about an axis of rotation 20, which extends between the center section and the lateral section 6a, 6b, as well as about an axis of rotation 21 at the leg 12.

Figure 3:
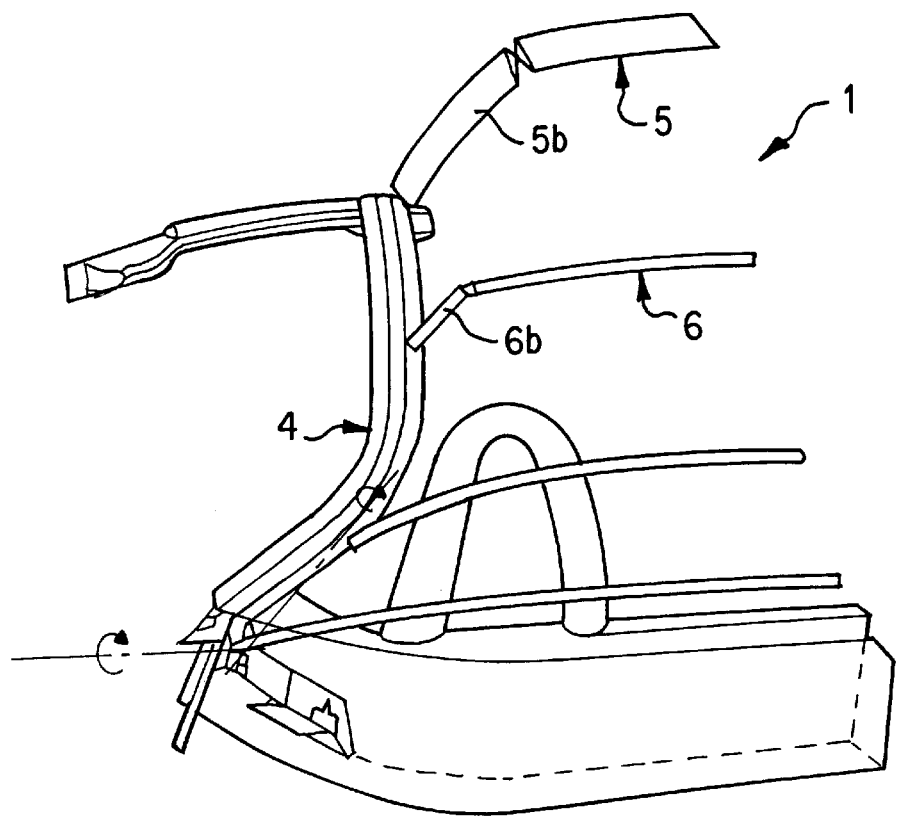
Figure 4:
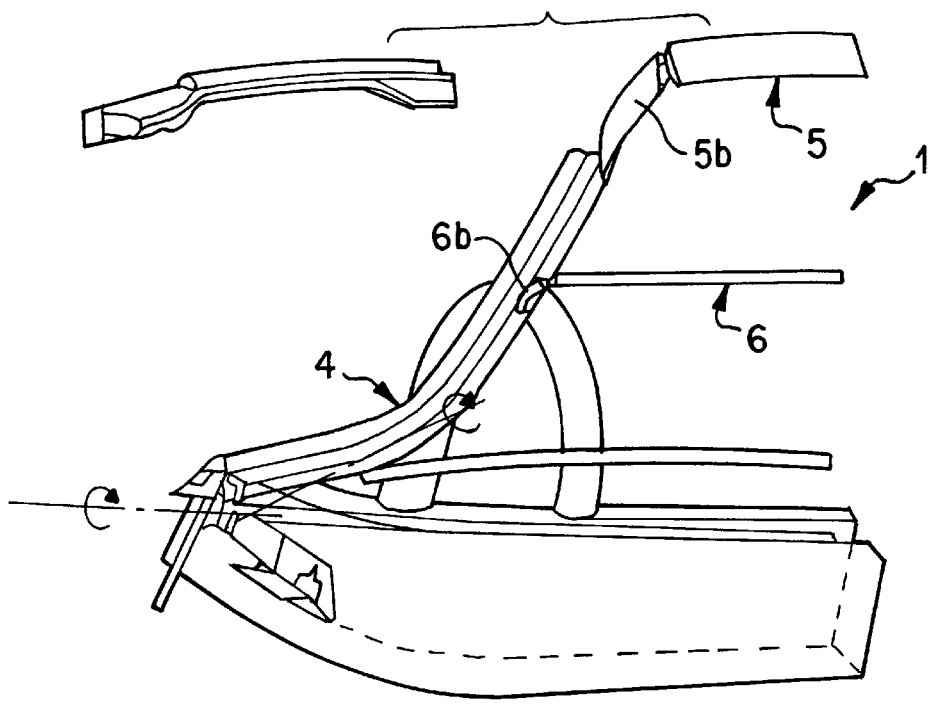

FIGS. 3 and 4 shows additional intermediate positions of the folding top 1 displaced in the direction of the deposited position. The lateral sections 5b, 6b of the roof frame 5 and the hoop 6 in this case rise increasingly from a position which is approximately horizontal in the closed position to an increasingly vertical position.

As the result of the folding-in of the side bow 4 in the direction of the vehicle interior and the folding-together of the hoops 5 and 6, the covering material of the folding top is relaxed so that the covering material can be folded together in the intended folds.

Figure 5:
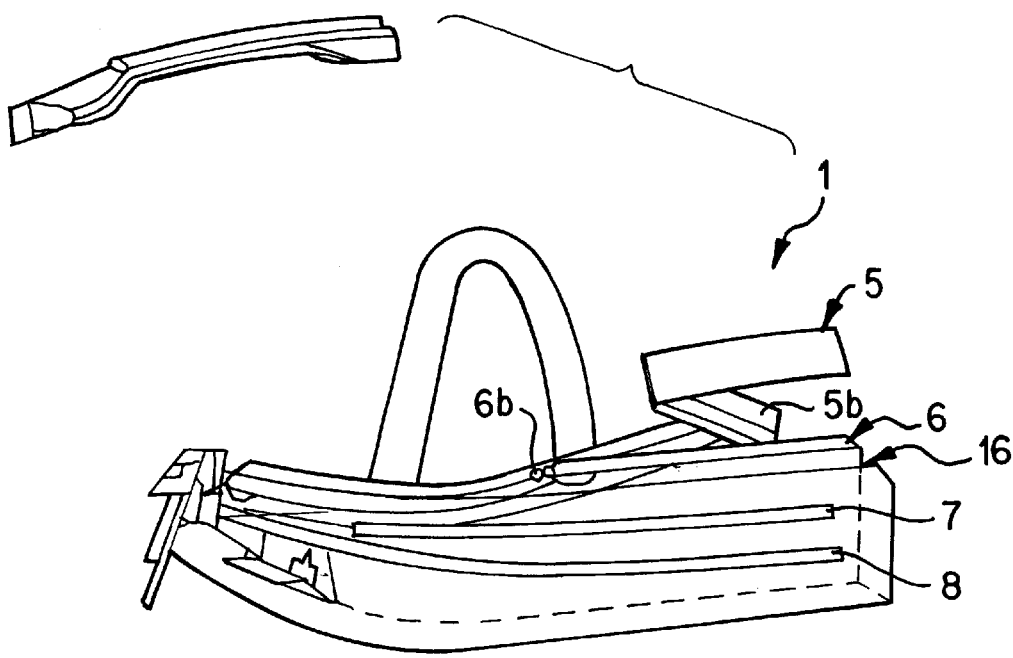

In FIG. 5, the folding top 1 is already partially in the depositing space 16. The rearward supporting hoops 7 and 8 have already essentially reached their final depositing position in the depositing space 16. The roof frame 5, which is divided into three pieces, and the hoop 6 are folded together in a Z-shape in that, after their vertical position has been exceeded, the lateral sections 5b and 6b are swivelled into a horizontal position, specific ally the deposited position, in which case the sections are aligned oppositely horizontally in the deposited position and in the closed position.

Figure 6:
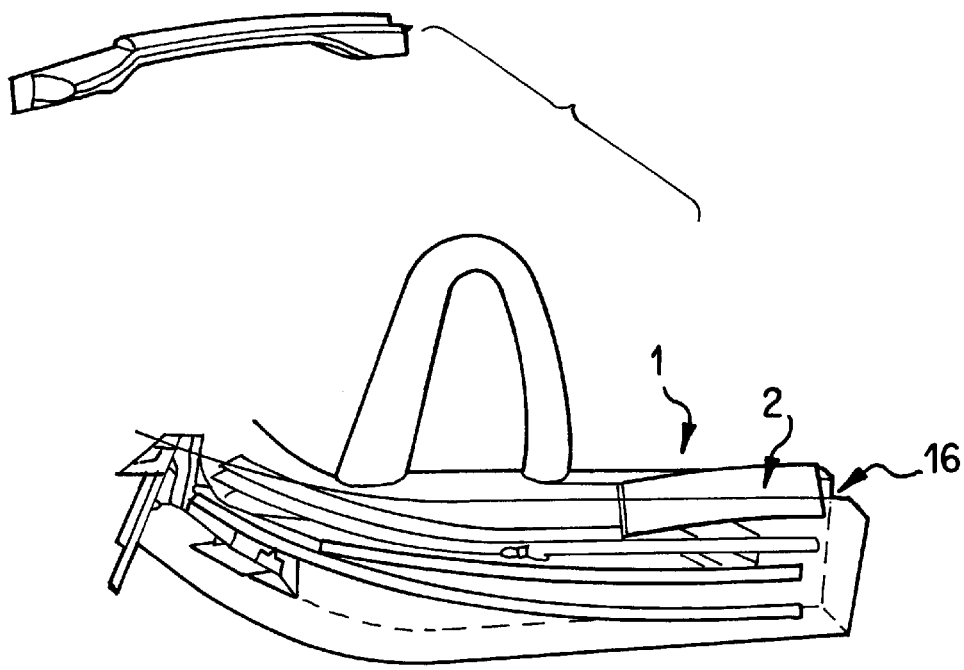
FIG. 6 is a view of the folding top in the deposited position.

In FIG. 6, the folding top 1 is situated in its deposited position 22 in which the folding top is completely lowered into the depositing space 16. The depositing space 16 can optionally be closed with a lid or with s cover.

The linking of the material at the vehicle in the rearward area of the folding top can take place loosely as well as in a fixedly connected manner. The illustrated folding top is suitable particularly for two-seaters, in the case of which the side windows are shorter than half the depositing space width for the folding top, so that the side bows with their horizontal legs reaching over the upper edge of the side windows in the deposited position can be arranged at the same level, mirror-symmetrically to one another and without any mutual hindrance.

The folding top can be adjusted between the closed position and the deposited position manually or by an electric motor.

In the embodiments according to FIGS. 7a to 11b, components corresponding to the first embodiment have the same reference numbers.

Figure 7B:
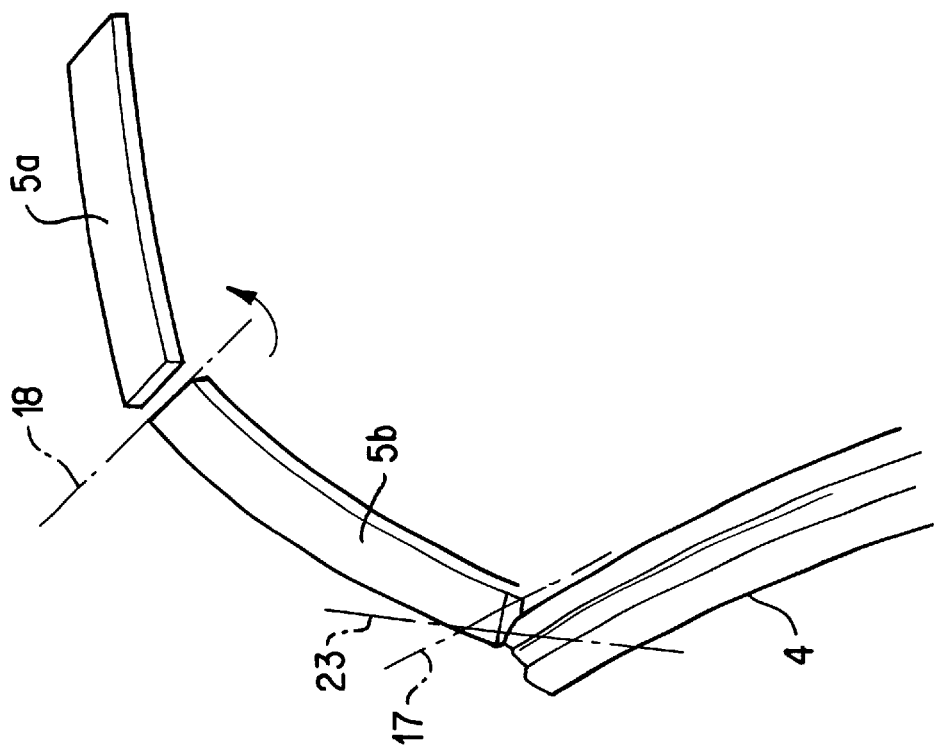
FIGS. 7a, b are enlarged views of the roof frame extending transversely in the front in two different positions.
Figure 7A:
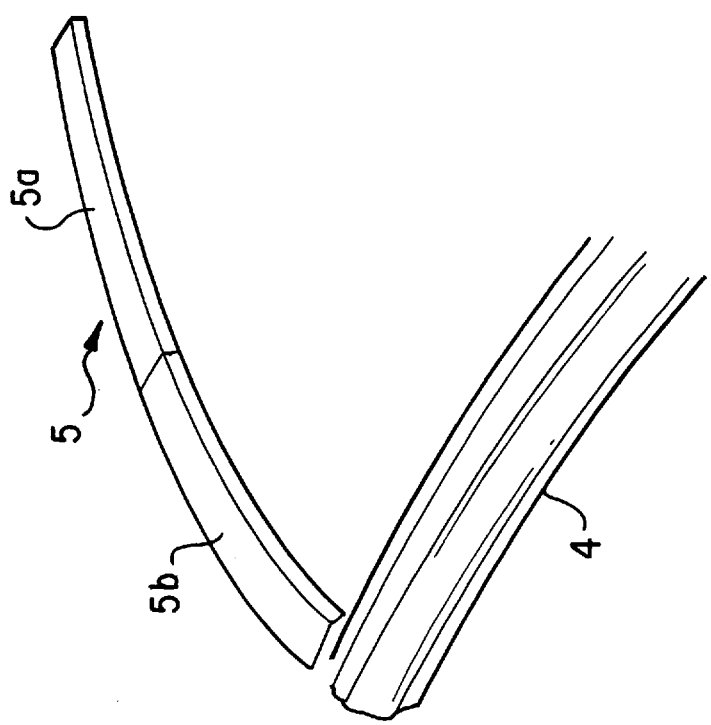

FIGS. 7a, 7b illustrate enlarged cutouts of the area of the forward, transversely extending roof bow constructed as a roof frame 5, by way of which the connection between the windshield and the folding top is established in the closed position. The roof frame 5 has a center section 5a and two outer sections 5b which are arranged to be rotatable with respect to the center section 5a as well as the lateral fastening on the side bow 4. In the closed position illustrated in FIG. 7a, all sections 5a, 5b of the roof bow are arranged in a row behind one another and have a common longitudinal axis. In the intermediate position between the closed position and the deposited position illustrated in FIG. 7b, in a projection onto a plane perpendicular to the vertical axis of the vehicle, the roof bow has a shortened length measured in the longitudinal direction of the roof bow. The length reduction of the roof bow is achieved by the rotation of sections 5a, 5b of the roof bow relative to one another and by the rotation of the lateral sections 5b relative to the side bow 4, the hinges between the center sections and the lateral sections 5a, 5b having the axis of rotation 18 which, in the closed position, is directed in parallel to the longitudinal axis of the vehicle. The hinges between the lateral sections 5b and the side bow 4 have two axes of rotation 17, 23, of which one axis of rotation 17 in the closed position is also aligned in parallel to the longitudinal axis of the vehicle and an axis of rotation 23 extends in parallel to the vertical axis of the vehicle.

Expediently, the movements around the axes of rotation 17 and 23 are coupled with one another in order to be able to implement a kinematically restrictedly guided movement of the folding top without additional degrees of freedom. The coupled rotating movement around the axes of rotation 17 and 23 leads to a spatial rotation of the lateral section 5b with respect to the side bow 4, whereby, in addition to the shortening of the roof frame length, during the transition into the deposited position viewed in the longitudinal direction of the vehicle, the roof frame is folded toward the rear relative to the side bow 4.

Figure 8B:
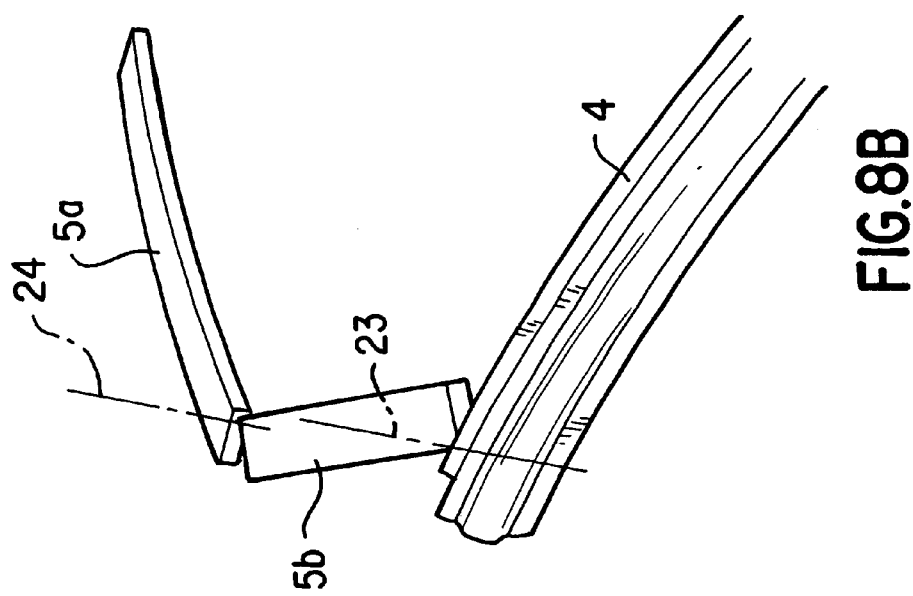
FIGS. 8a, b are views of another embodiment of a roof frame in two different positions.
Figure 8A:
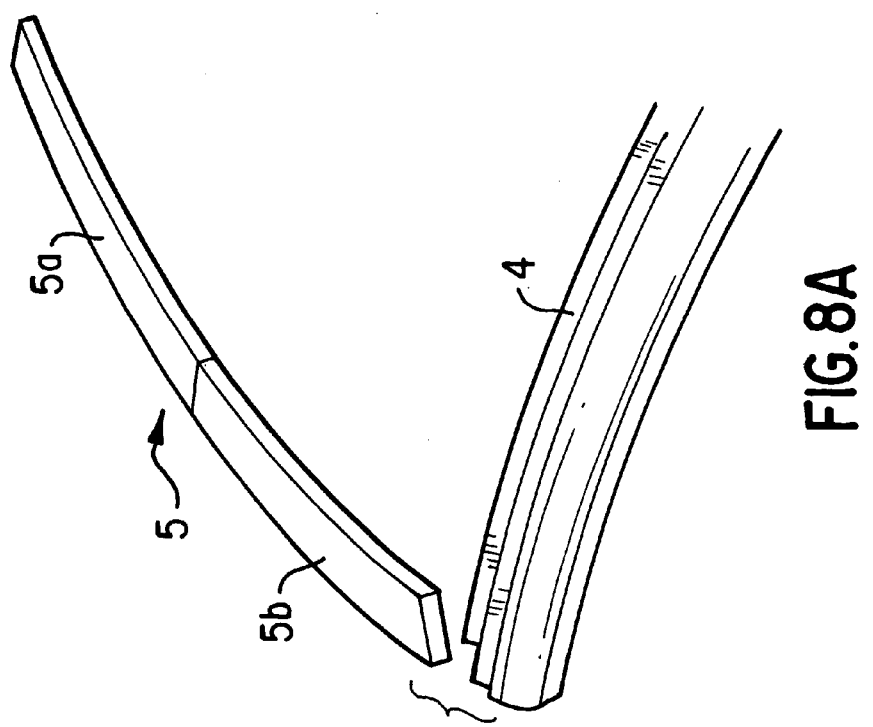

In the embodiment according to FIG. 8a, b, the roof bow or roof frame 5 again has a center section 5a and two lateral sections 5b which are coupled in an articulated manner and adjoin the center sections on both sides, which sections 5b are held in an articulated manner on a side bow 4 of the folding top. The hinges between the center section 5a and the lateral sections 5b permit a rotation about a vertical axis 24. Correspondingly, the hinges between the lateral sections 5b and the side bows 4 permit a rotation about a vertical axis 23.

In its basic construction, the embodiment according to FIGS. 9a, b corresponds to the construction according to FIGS. 7a, b, but with the modification illustrated in FIG. 9b that the center section 5a of the roof bow has an additional hinge which divides the center section 5a into two subsections 5a* and 5a**. The additional hinge has the hinge axis 25 which, in the deposited position of the folding top, extends essentially in parallel to an additional, second hinge axis 27 of the lateral hinge between the side bow 4 and the roof bow 5 and permits a relative rotation of the two subsections 5a* and 5a**. The subsection 5a* is connected with the lateral section 5b. Because of the mutually coordinated position of the hinge axes 25, 27, the lateral section 5b of the roof bow can be lowered including the adjacent subsection 5a* in the deposited position, whereby the height of the depositing height is reduced.

Figure 10B:
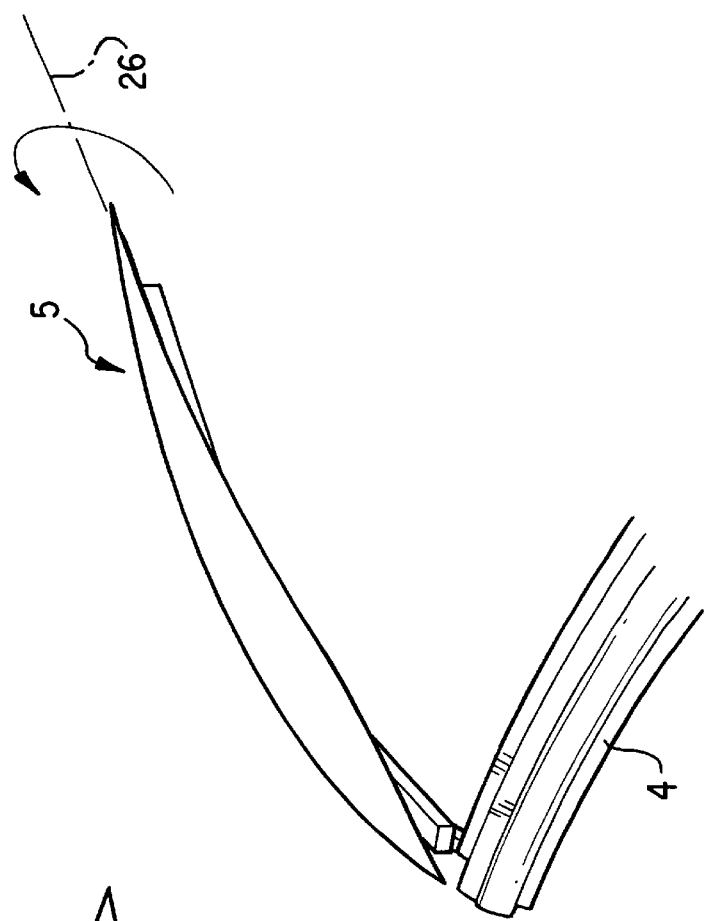
FIGS. 10a, b are views of another embodiment of a roof frame in two different positions.
Figure 10A:
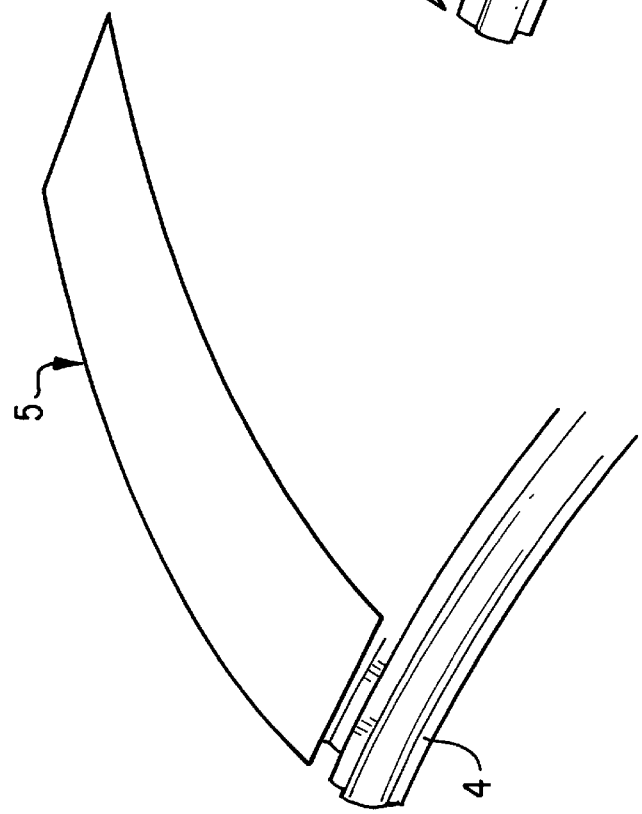

According to FIGS. 10a, b, it may also be expedient according to another embodiment to arrange the forward roof frame 5 or a component connected with the roof frame 5 to be swivellable about a hinge axis 26 which, in the closed position of the folding top, extends approximately in parallel to the transverse axis of the vehicle. This swivelling movement can take place particularly in addition to other swivelling movements of the roof frame 5 about a longitudinal axis and/or a vertical axis. Instead of the roof frame 5, any arbitrary roof bow, which extends transversely to the longitudinal axis of the vehicle, can also be further developed in this manner.

Figure 11B:
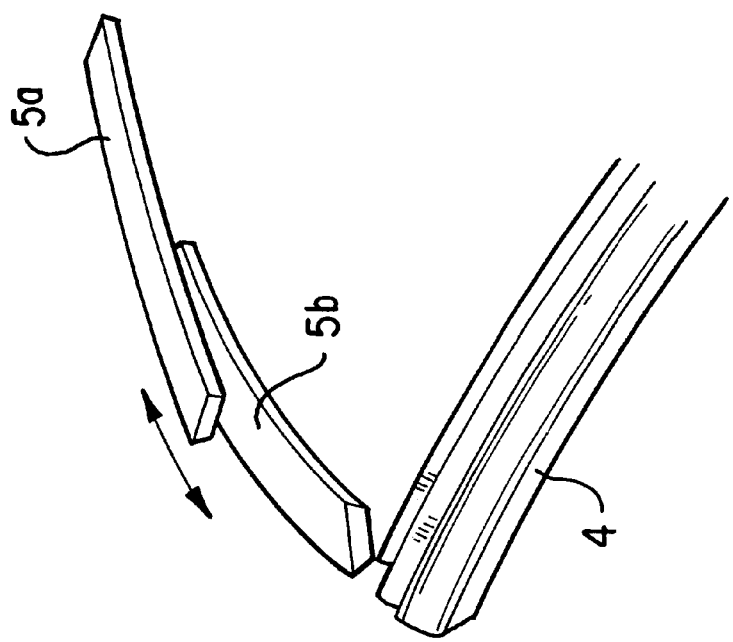
FIGS. 11a, b are views of another embodiment of a roof frame in two different positions.
Figure 11A:
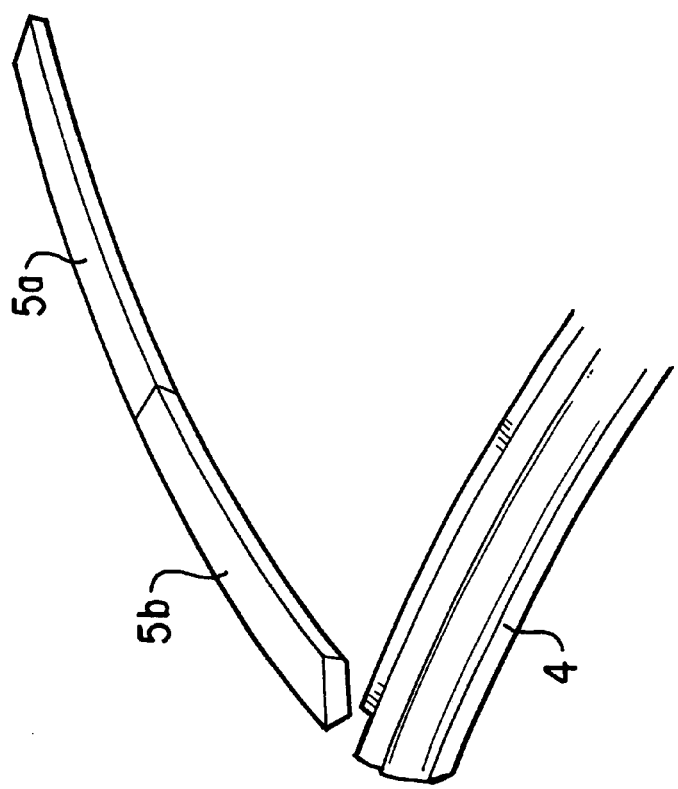

According to the embodiment of FIGS. 11a, b, the center section 5a and the lateral sections 5b are translationally displaced relative to one another during the transition between the closed position and the deposited position in that, during the transition in the direction of the deposited position, the lateral sections 5b slide under the center section 5a. The lateral sections 5b are connected with the side bows 4 in an articulated manner. The translational shortening or extension of the roof bow can optionally be combined with a rotating movement of individual or several roof bow sections.

LIST OF REFERENCE NUMBERS

1 Folding top
2 closed position
3 folding top linkage
4 side bow
5 roof frame
5a, b section
6 supporting hoop
6a, b section
7 supporting hoop
8 supporting hoop
9 direction
10 windshield frame
11 leg
12 leg
13 hinge
14 axis of rotation
15 axis of rotation
16 depositing space
17 hinge axis
18 hinge axis
19 lock
20 hinge axis
21 axis of rotation
22 deposited position
23 hinge axis
24 hinge axis
25 hinge axis
26 hinge axis
27 hinge axis

What is claimed is:

1. A folding top for a motor vehicle which can be adjusted between a closed position and a deposited position comprising:

a folding top linkage including a plurality of adjustable side bows, and at least one roof bow having a transverse length as viewed in a longitudinal direction of the vehicle;

wherein the length of the at least one roof bow varies as a function of a movement position of the folding top to and from the closed position and the deposited position.

2. Folding top according to claim 1, wherein the length of the at least one roof bow varies in a kinematically restrictedly guided manner as a function of the position of the folding top.

3. Folding top according to claim 1, wherein, in the closed position, the roof bow extends essentially along an entire width of the folding top.

4. Folding top according to claim 1, wherein the at least one roof bow is in one piece.

5. Folding top according to claim 1, wherein the at least one roof bow is constructed in several pieces with at least two sections which are arranged to be movable with respect to one another.

6. Folding top according to claim 4, wherein the at least one section of the roof bow is rotatably disposed.

7. Folding top according to claim 5, wherein the at least one section is arranged to be translationally displaceably disposed relative to another of the sections.

8. Folding top according to claim 5, wherein the roof bow is divided into one center section and two lateral sections.

9. Folding top according to claim 8, wherein the two lateral sections are foldably connected by way of one hinge respectively with the center section.

10. Folding top according to claim 9, wherein, in the closed position, a hinge axis of at least one hinge extends in parallel to the longitudinal direction of the vehicle.

11. Folding top according to claim 9, wherein, in the closed position, the hinge axis of at least one hinge extends in a direction parallel to a vertical axis of the vehicle.

12. Folding top according to claim 9, wherein, in the closed position, the hinge axis of at least one hinge extends transversely to the longitudinal direction of the vehicle.

13. Folding top according to claim 8, wherein the two lateral sections and the center section are arranged to be displaceable relative to one another in a displacement direction.

14. Folding top according to claim 13, wherein the displacement direction coincides with the longitudinal direction of the vehicle.

15. Folding top according to claim 1, wherein a sealing device for a liquid-tight connection with the folding top is arranged on a windshield frame of the vehicle.

16. Folding top according to claim 1, wherein a side bow, which is connected with the at least one roof bow, is connected in a lateral area of the folding top in parallel to the longitudinal axis of the motor vehicle.

17. Folding top according to claim 16, wherein substantially an entire length of the side bow forms a support for the folding top covering.

18. Folding top according to claim 1, wherein substantially an entire length of the side bow forms a support for a sealing device.

19. Folding top according to claim 1, wherein the at least one roof bow forms a roof frame which, in the closed position, is held on the windshield frame.

* * * * *